Patented July 4, 1944

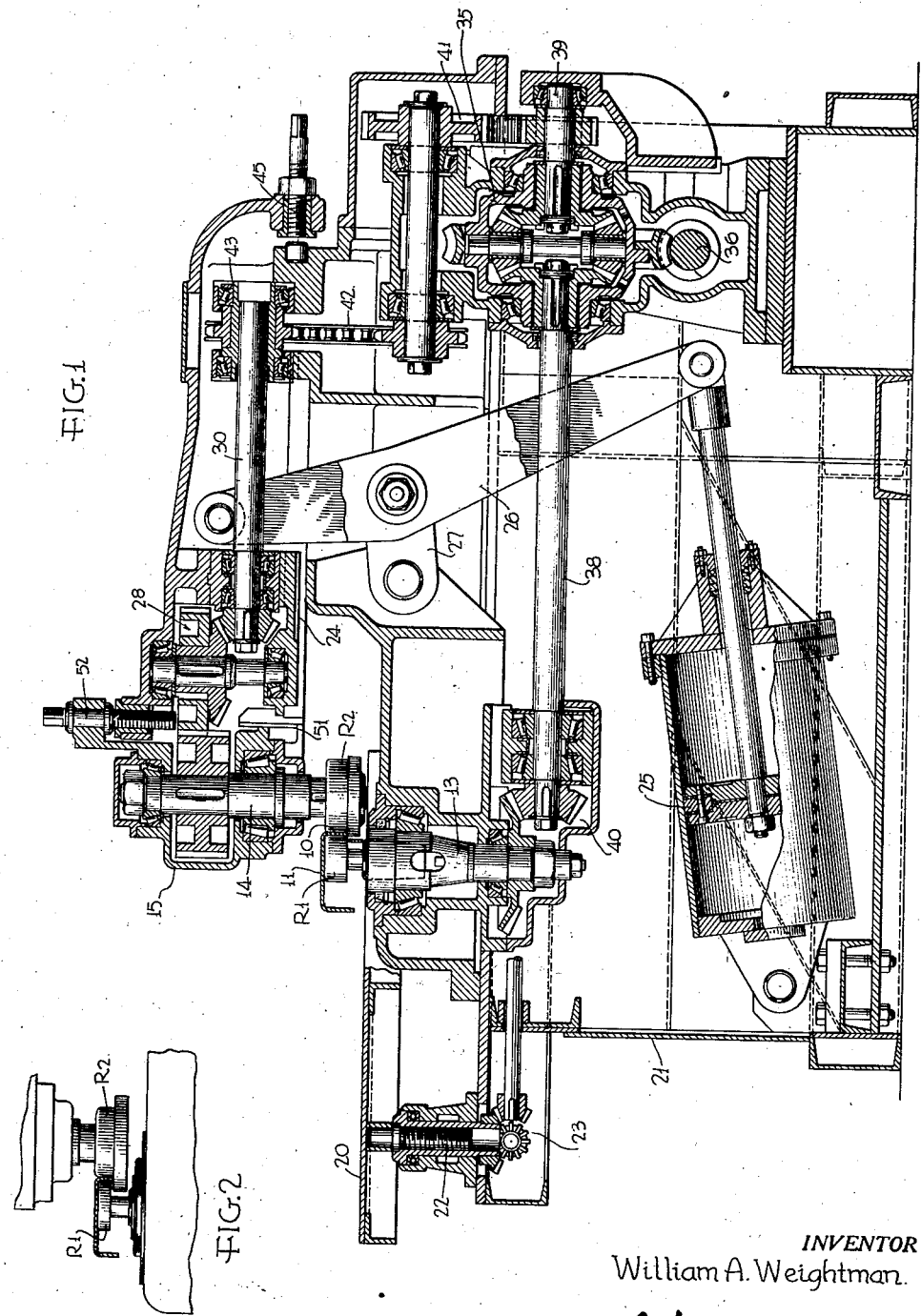

2,352,816

UNITED STATES PATENT OFFICE 2,352,816

TRIMMING AND FORMING MACHINE AND THE LIKE

William A. Weightman, Philadelphia, Pa., assignor to Edward G. Budd Manufacturing Company, Philadelphia, Pa., a corporation of Pennsylvania Application October 21, 1943, Serial No. 507,093

2 Claims. (Cl. 164—60)

This invention relates to trimming and forming machines and the like and has for an object the provision of improvements in this art.

One of the particular objects is to provide a machine having rolls which run together upon the stock at the same peripheral speed or without slippage regardless of relative roll sizes, whereby to avoid scraping or tearing the stock or injuring the rolls and their driving mechanism.

Another object is to accomplish this result without change-speed gearing or slip drives.

Another object is to provide complete matching of peripheral roll speeds by very simple mechanism which requires no change or attention when speed changes are required.

The above and other objects and advantages of the invention will be apparent from the following description of an exemplary embodiment thereof, reference being made to the accompanying drawing, wherein:

Fig. 1 is a vertical section of a machine embodying the invention; and

Fig. 2 is a side elevation of two mating forming rolls operating to turn the edges of side flanges inward.

The rolls R1 and R2 operate against the opposite sides of the flange 10 of a strip of stock or workpiece 11, hence should operate at the same peripheral speed if slippage with consequent damage to stock or machine are to be avoided. The rolls may be of the same diameter but usually are of different diameters varying through an unlimited range inasmuch as stock of various shapes and dimensions is to be operated upon. As illustrated, the roll R1 is smaller than the roll R2 and operates inside the channel of the stock while the roll R2 operates on the outside. The roll R1 may be removably secured to a rotating shaft or spindle 13 operating in fixed bearings, and the roll R2 is removably secured to a rotating shaft or spindle 14 operating in bearings on a slidable head 15. For convenience, the roll R1 will be referred to as the fixed roll and the roll R2 will be referred to as the movable or presser roll.

The trimming rolls of Fig. 1 have closely related sharp edges for trimming off the edges of the stock flanges while the rolls of Fig. 2, which are similarly designated as R1, R2, have edges which are less sharp and spaced axially further apart to turn the remaining edges of the flanges laterally relative to the bases of the flanges.

The machine comprises a table support 20 adjustably mounted upon a base 21, as upon a plurality of screw pedestals 22 operated in unison by shaft gearing 23. Only one pedestal is shown in elevation. The spindle 13 of the fixed roll R1 extends through the top of the table and is sealed therebelow to prevent passage of chips and scale to its bearings.

The pressure roll R2 is mounted above the table to avoid having the usual slot in the table for its shaft 14. The head 15 for the pressure roll R2 is mounted on gibs or ways 24 above and behind the table top and is moved back and forth as required by quick-acting power means exemplified by a piston 25 acting through a lever 26 pivoted to the base by a link 27. The shaft 14 is driven by bevel and spur gearing 28 and a splined shaft 30 in any position of the head 15, both gearing and shaft being carried by the head.

As stated, the rolls R1 and R2 are caused to rotate at the same or any required peripheral speed when pressed together upon the stock. The means for effecting this comprises a differential 35 driven by a worm shaft 36 from a motor and driving the fixed roll R1 and the pressure roll R2 through differential shafts 38 and 39, respectively. The shaft 38 extends directly to the bevel gearing 40 which drives the shaft 13 and the shaft 39 is connected through gearing 41 and a chain drive 42 to a fixed splined sleeve 43 through which the splined shaft 30 slides.

An adjustable stop 45 is provided for limiting the forward position of the slidable head 15.

Means are provided for adjusting the vertical position of the pressure roll R2. The slide 15 of the roll R2 is movable on vertical ways or gibs 51 at the front end of the head and shifted up and down by a shouldered adjusting screw 52 which is threaded in the head.

The invention provides a very efficient machine for operating paired opposed driven rolls and the principles may be applied to machines and operations other than those illustrated. As applied to a trimming machine it is particularly advantageous and the machine illustrated and described is very convenient and versatile in use. The work table is almost unobstructed and does not permit chips or other objectionable material to fall through the driving mechanism. A great variety of stock can be accommodated with equal facility without gear change or other delay except change of rolls. These are readily accessible for quick change. The danger of unequal surface speed of rolls such as causes injury to stock or machine is entirely avoided and no matter what the relative sizes, the rolls will automatically pick up the required surface speed for true rolling motion relative to the stock surface.

While one embodiment has been illustrated and described, it will be understood that the invention may have various embodiments within the limits of the prior art and the scope of the subjoined claims.

What is claimed is:

1. Apparatus of the character described comprising in combination, a table, two roll shafts supporting two rolls above the table for operation upon a common workpiece, one shaft extending downward through the table and the other shaft extending upward away from the top of the table, a vertically movable head carrying said second shaft, a horizontally movable head carrying said vertically movable head, means for adjusting said heads and pressing said rolls together upon the stock, and common means for driving said rolls together for true rolling motion regardless of their diameter; said driving means including a differential gearing and splined shaft connections for the upper roll shaft on said movable heads.

2. Apparatus of the character described comprising in combination, two spaced parallel oppositely extended shafts carrying cutting or shaping rolls adapted to roll together upon a common workpiece, means supporting one of said shafts for axial adjustment, a carrier supporting said shaft and first adjusting means for trans-axial movement, common means for driving said rolls together for true rolling motion regardless of their diameter, said driving means including a differential drive, and spline drive connections to said adjustable roll shaft, and quick-acting power means for effecting the transaxial movement as for inserting stock between the rolls.

WILLIAM A. WEIGHTMAN.